United States Patent
Mallya

(10) Patent No.: US 11,558,395 B2
(45) Date of Patent: Jan. 17, 2023

(54) RESTRICTING ACCESS TO COGNITIVE INSIGHTS

(71) Applicant: International Business Machines Corporation, Armonk, NY (US)

(72) Inventor: Shailaja Mallya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 16/868,320

(22) Filed: May 6, 2020

(65) Prior Publication Data

US 2021/0352078 A1    Nov. 11, 2021

(51) Int. Cl.
*H04L 9/40* (2022.01)
*G06N 5/04* (2006.01)
*G06N 20/00* (2019.01)

(52) U.S. Cl.
CPC ............. *H04L 63/105* (2013.01); *G06N 5/04* (2013.01); *G06N 20/00* (2019.01)

(58) Field of Classification Search
CPC ......... H04L 63/105; G06N 5/04; G06N 20/00
USPC .......................................................... 726/4
See application file for complete search history.

(56) References Cited

U.S. PATENT DOCUMENTS 7,864,959 B2    1/2011  Dhawan
9,774,586 B1    9/2017  Roche et al.
10,069,842 B1 *  9/2018  Bradley .............. H04L 63/0281
2015/0356430 A1 * 12/2015  Saxena .................... G06N 5/04
                                                            706/46
2021/0157923 A1 *  5/2021  Mallya ................ G06F 21/6218

FOREIGN PATENT DOCUMENTS

JP    2019008568 A  *  1/2019   ............. G06F 21/12

OTHER PUBLICATIONS

Authors et. al.: Disclosed Anonymously, "Implementing Multi Level Security in Cognitive Computing (Data Mining)" IP.com Electronic Publication Date: Feb. 19, 2019, 6 pages.
U.S. Appl. No. 16/691,804 entitled "Cluster Security Based on Virtual Machine Content", filed Nov. 22, 2019.

* cited by examiner

*Primary Examiner* — Kambiz Zand
*Assistant Examiner* — Aubrey H Wyszynski
(74) *Attorney, Agent, or Firm* — Patterson + Sheridan, LLP

(57) ABSTRACT

Techniques for ensuring the security of cognitive insights are disclosed. A request to generate a cognitive insight is received from a requestor. The requestor is associated with a requestor data security level. The cognitive insight is generated using a first machine learning model and a plurality of data sources, each data source associated with a respective data security level. An insight data security level for the generated cognitive insight is identified based on the insight and the plurality of data sources. A first data security level associated with a data source of the plurality of data sources is modified, based on the identified insight data security level. It is determined, based on the requestor data security level and the insight data security level, that the requestor is authorized to access the generated insight. In response the generated insight is provided to the requestor.

20 Claims, 9 Drawing Sheets

US 11,558,395 B2

RESTRICTING ACCESS TO COGNITIVE INSIGHTS

BACKGROUND

The present invention relates to machine learning, and more specifically, to ensuring the security of cognitive insights.

SUMMARY

Embodiments include a method. The method includes receiving a request to generate a cognitive insight from a requestor, the requestor associated with a requestor data security level. The method further includes generating the cognitive insight using a first machine learning model and a plurality of data sources, each data source associated with a respective data security level. The method further includes identifying, based on the insight and the plurality of data sources, an insight data security level for the generated cognitive insight. The method further includes modifying a first data security level associated with a data source of the plurality of data sources, based on the identified insight data security level. The method further includes determining, based on the requestor data security level and the insight data security level, that the requestor is authorized to access the generated insight, and in response providing the generated insight to the requestor.

Embodiments further include a system, including a processor, and a memory storing a program, which, when executed on the processor, performs an operation. The operation includes receiving a request to generate a cognitive insight from a requestor, the requestor associated with a requestor data security level. The operation further includes generating the cognitive insight using a first machine learning model and a plurality of data sources, each data source associated with a respective data security level. The operation further includes identifying, based on the insight and the plurality of data sources, an insight data security level for the generated cognitive insight. The operation further includes modifying a first data security level associated with a data source of the plurality of data sources, based on the identified insight data security level. The operation further includes determining, based on the requestor data security level and the insight data security level, that the requestor is authorized to access the generated insight, and in response providing the generated insight to the requestor.

Embodiments further include a non-transitory computer program product including a computer-readable storage medium having computer-readable program code embodied therewith, the computer-readable program code executable by one or more computer processors to perform an operation. The operation includes receiving a request to generate a cognitive insight from a requestor, the requestor associated with a requestor data security level. The operation further includes generating the cognitive insight using a first machine learning model and a plurality of data sources, each data source associated with a respective data security level. The operation further includes identifying, based on the insight and the plurality of data sources, an insight data security level for the generated cognitive insight. The operation further includes modifying a first data security level associated with a data source of the plurality of data sources, based on the identified insight data security level. The operation further includes determining, based on the requestor data security level and the insight data security level, that the requestor is authorized to access the generated insight, and in response providing the generated insight to the requestor.

DETAILED DESCRIPTION

Figure 1:
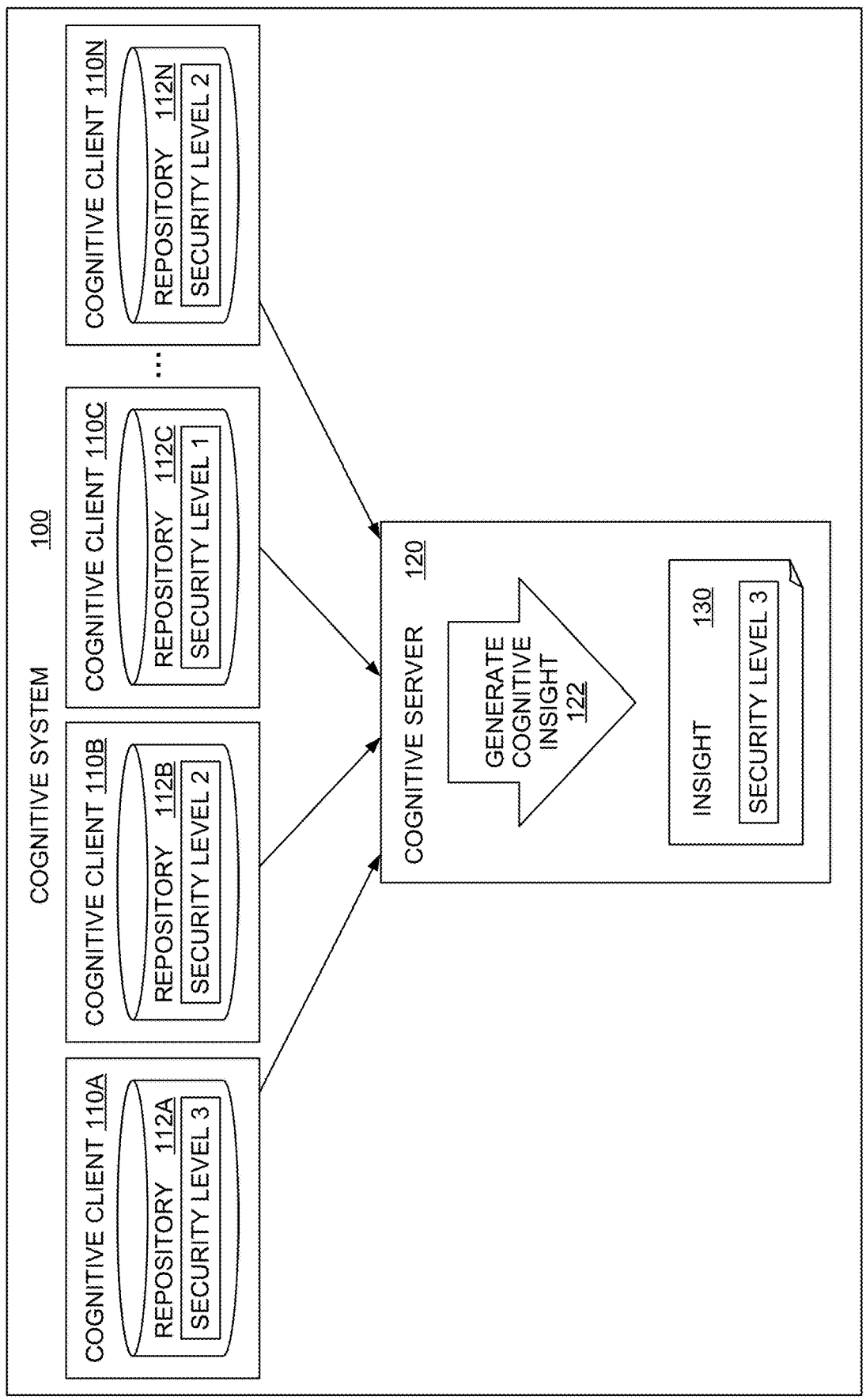
FIG. 1 illustrates generating cognitive insights using secure data, according to at least one embodiment.

The rise in popularity of cognitive systems (e.g., using machine learning) has brought to light new security concerns. For example, data used as inputs to a cognitive system may have a defined security classification, meaning the data is accessible to a limited set of users based on each user's allowed security clearance. The cognitive insight (e.g., an answer to a question, a response based on a collection of data, or any other suitable cognitive insight) generated by the cognitive system may also need a security classification to ensure that only authorized users can access the insight.

In some circumstances, the insight has a security classification comparable to one or more of its data inputs. But in other circumstances, the insight may have higher security classification than its data inputs. The combination of data at one security clearance level may, perhaps unexpectedly, give rise to a cognitive insight that should be classified at a higher security level.

For example, data used for cognitive insights can be maintained at a number of independent systems (e.g., operating virtual machines (VMs)) with different data repositories. A suitable distributed information protocol (e.g., Lightweight Directory Access Protocol (LDAP)) can be used to maintain and retrieve the data across the different data repositories. Data maintained at the repositories can change over time, and the security level associated with the data can also change. For example, newly added data to a particular repository can raise the security level required for a user to access data at the repository. As another example, data removed from a repository can lower the security level required for a user to access data at that repository. As another example, data generated (or modified) by a process at the repository can change the security level required for a user to access data at that repository.

In one embodiment, insights generated by a cognitive system can be set to the highest security level of any data used by the cognitive system. This, however, does not account for insights that should be assigned to a higher security level than any individual component data. For example, the combination of multiple data sources may allow the cognitive system to generate an insight that should be governed by a higher level of security than any of the individual data sources.

In an embodiment, data security for a generated cognitive insight an be improved by analyzing the cognitive insight (e.g., using a trained machine learning model) to identify that the insight should be assigned a higher level of security. Further, one or more of the data components used to generate the insight can be assigned to a higher level of security, since the data is capable of being used to generate an insight with a higher level of required security. For example, after determining that a generated insight should be assigned to a higher level of security, a system can both assign that security level to the insight (ensuring that only authorized users can access the insight) and assign that higher security level to the most recently added data source used to generate the insight (ensuring that future cognitive insights can only be generated and accessed by authorized users). This both ensures that the insight is accessible to only authorized users, and identifies and cures a potential flaw in the security status of the underlying data (e.g., the data source should have been assigned a higher security level).

FIG. 1 illustrates generating cognitive insights using secure data, according to at least one embodiment. A cognitive system 100 includes a number of cognitive clients 110A-N and a cognitive server 120. In an embodiment, the cognitive system 100 is a cognitive computing system, for example a machine learning system, that analyzes input data to generate cognitive insights based on the data (e.g., mimicking human cognition). For example, the cognitive system 100 can analyze data and generate responses to questions, identify anomalies or issues, identify patterns, generate analysis, etc. This can be done using any suitable machine learning or artificial intelligence technique (e.g., using a trained machine learning model, as described below with regard to FIG. 6).

In an embodiment, each of the cognitive clients 110A, 110B, 110C, through 110N, includes a respective data repository 112A, 112B, 112C, through 112N. The repositories store data for use by the cognitive server 120 to generate one or more insights (e.g., the insight 130 illustrated in FIG. 1). For example, the cognitive system 100 can operate in a data center and the cognitive clients 110A-N can each be LDAP clients (e.g., VMs) operating in the data center. Each repository 112A-N stores data accessible using the respective cognitive client 110A-N.

In an embodiment, each repository 112A-N has an associated data security level. These can be associated with required governmental security clearance for users (e.g., confidential, secret, top secret) or with other security levels (e.g., levels 1-N). For example, as illustrated in FIG. 1, the repository 112A is associated with a data security level of 3. This means that only users with a data security level of 3 or higher are permitted to access the data stored in the repository 112A. The repository 112B is associated with a data security level of 2, meaning that a user must have a security level of 2 or higher (e.g., 3, 4, etc.) to be permitted to access the data stored in the repository 112B. The repository 112C is associated with a data security level of 1, and the repository 112N is associated with a data security level of 2.

In an embodiment, all data in a given repository is associated with a given data security level. For example, in this embodiment, all data stored in the repository 112A is associated with a data security level of 3. Alternatively, or in addition, the data stored in each repository can be associated with multiple security levels. For example, the repository 112A could include some data with a data security level of 3, along with additional data with a data security level of 2. In an embodiment, the security level 3 is the highest data security level for any data in the repository 112A, but the repository 112A also includes data associated with a lower data security level.

In an embodiment, a requestor can have different security authorization for different data or different data repositories (e.g., using security domains). For example, a given requestor may be authorized to access data up to data security level 3 from the repository 112B, but may only be authorized to access data up to data security level 2 from the repository 112A. This could be, for example, because of the content of data stored in the repositories 112A and 112B, the source of the data stored in the repositories 112A and 112B, etc. In an embodiment, this can be enforced using security domains.

In an embodiment, data added to a repository 112A-N, or data modified in a repository 112A-N, can be quarantined until an appropriate security level is assigned to the data. In an embodiment, quarantined data is not accessible to requestors until the security level is assigned. For example, a suggested security level can be provided to an administrator, who can choose to assign the suggested security level (or another security level). Alternatively, the quarantined data can be automatically assigned the suggested security level. This can ensure that a user is not permitted to access unauthorized data.

In an embodiment, the cognitive server 120 receives data from each of the cognitive clients 110A-N (e.g., data stored in the repositories 112A-N). The data can be transmitted from the cognitive clients 110A-N to the cognitive server 120 using any suitable communication network (e.g., a local area network, a wide area network, the Internet, etc.) and using any suitable communication technology (e.g., WiFi, a cellular connection, a wired network connection, etc.). Alternatively, or in addition, one or more of the cognitive clients 110A-N can reside on the same computer system as the cognitive server 120, or can be directly connected with the cognitive server 120.

At block 122, the cognitive server generates a cognitive insight 130 (e.g., based on analyzing the input data from the cognitive clients 110A-N). The insight also has an associated security level (e.g., level 3 as illustrated in FIG. 1). A user must be authorized to access data with security level of 3 or higher to be permitted to access the insight 130. In an embodiment, the insight 130 has a security level of 3 to match the highest security level of the input data: the security level 3 data stored in the repository 112A.

Figure 2:
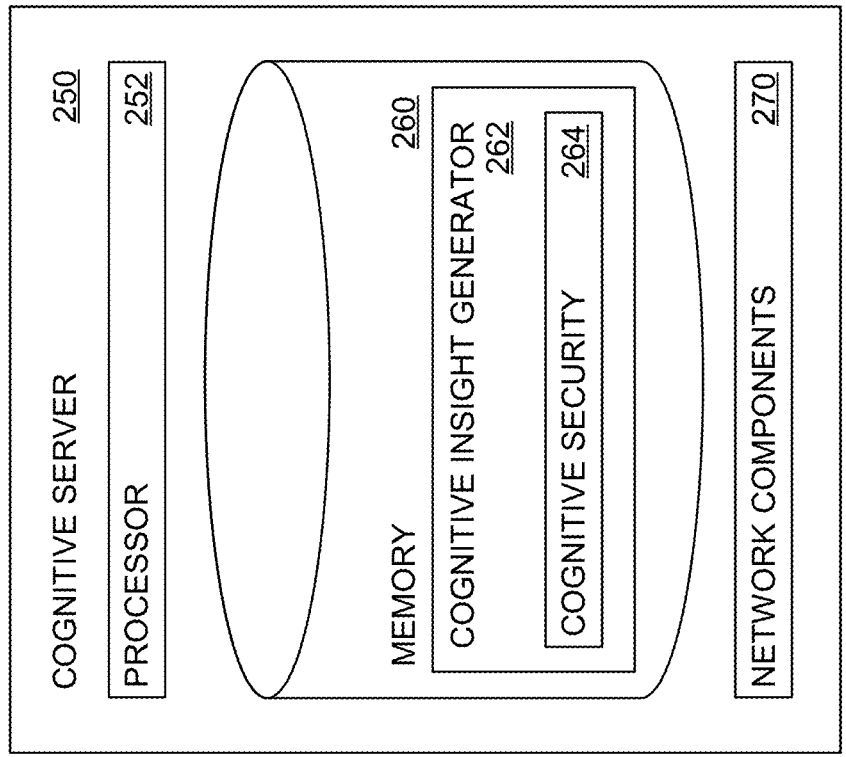
FIG. 2 is a block diagram illustrating a cognitive client and a cognitive server for ensuring the security of cognitive insights, according to at least one embodiment.
Figure 2:
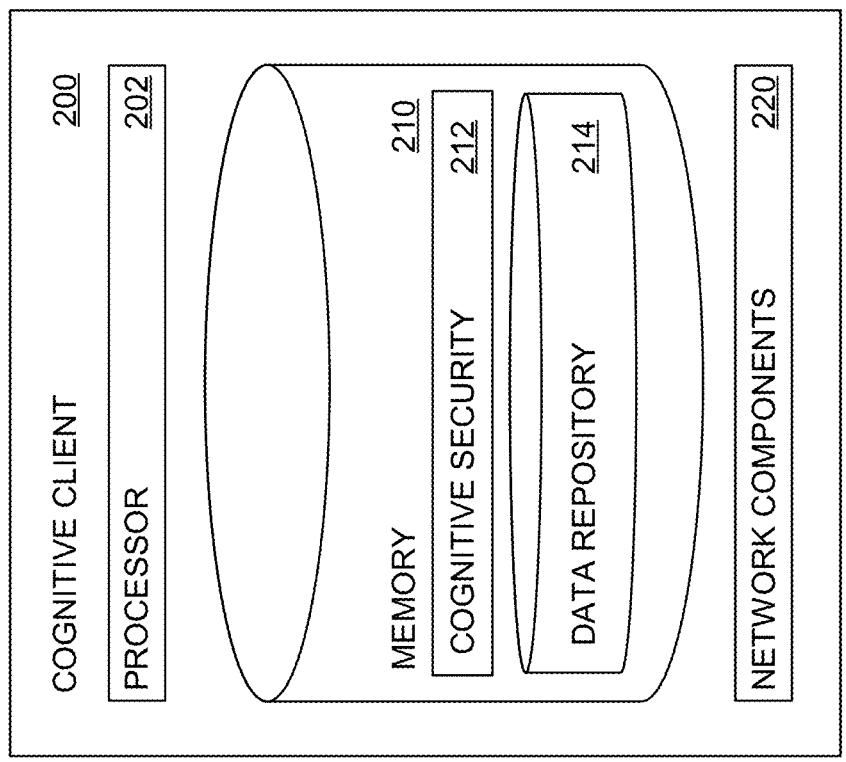

FIG. 2 is a block diagram illustrating a cognitive client 200 and a cognitive server 250 for ensuring the security of cognitive insights, according to at least one embodiment. The cognitive client 200 includes a processor 202, a memory 210, and network components 220. The processor 202 generally retrieves and executes programming instructions stored in the memory 210. The processor 202 is included to be representative of a single central processing unit (CPU), multiple CPUs, a single CPU having multiple processing cores, graphics processing units (GPUs) having multiple execution paths, and the like.

The network components 220 include the components necessary for the cognitive client 200 to interface with a cognitive server, as discussed above in relation to FIG. 1. For example, the network components 220 can include wired, WiFi or cellular network interface components and associated software to facilitate communication between the cognitive client 200 and the cognitive server 250.

Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory. The memory 210 generally includes program code for performing various functions related to use of the cognitive client 200. The program code is generally described as various functional "applications" or "modules" within the memory 210, although alternate implementations may have different functions and/or combinations of functions.

Within the memory 210, a cognitive security module 212 facilitates ensuring the security of cognitive insights, as discussed in subsequent figures. For example, in an embodiment the cognitive client 200 includes a data repository 214 (e.g., one of the repositories 112A-N illustrated in FIG. 1). The data repository 214 can store data with an associated security level (e.g., for some or all of the data). The cognitive security module 212 can be used to identify the associated security level for the data in the data repository 214, and can be used to set the security level for data in the data repository 214. This is discussed in further detail in subsequent figures.

Further, in an embodiment, the cognitive security module 212 can provide real time notifications for when files stored in the data repository 214 are modified, or new files are added or created. The cognitive server 250 can use these real-time notifications to trigger processing of the data in the files (e.g., generating or modifying insights, and setting proper security levels for the insights and the data).

In an embodiment the cognitive client 200 can perform multiple additional tasks relating to a cognitive system (e.g., the cognitive system 100 illustrated in FIG. 1). For example, the cognitive client 200 can monitor incoming new data (e.g., for storage in the data repository 214 and use in generating a cognitive insight), can monitor changes to the existing data within a system, and can monitor changes to the security levels for existing data on the system. The cognitive client 200 can also track the data (and its security level) that was involved in generating a particular cognitive insight, can share information (e.g., insights, new data, changes to data, and changes to security levels of data) with a cognitive server (e.g., the cognitive server 250), can monitor the information incoming from the cognitive server, can process the data accessible to a given user, or group, on the current system and generate insights, can ascertain if the insights generated are within security clearance of the user(s), or group(s) that have access to the data that, generated this insight. Also based on the suggestions by the central controller. Further, the cognitive client 200 can dynamically change and suggest the security levels associated with the new insights, can dynamically change and suggest the new security levels for the new data based on its contribution to the insights it generated, and can share insights with the appropriate users.

The cognitive server 250 includes a processor 252, a memory 260, and network components 270. The processor 252 generally retrieves and executes programming instructions stored in the memory 260. The processor 252 is included to be representative of a single central processing unit (CPU), multiple CPUs, a single CPU having multiple processing cores, graphics processing units (GPUs) having multiple execution paths, and the like.

The network components 270 include the components necessary for the cognitive server 250 to interface with a wireless communication network, as discussed above in relation to FIG. 1. For example, the network components 270 can include wired, WiFi or cellular network interface components and associated software to facilitate communication between the cognitive client 200 and the cognitive server 250.

Although the memory 260 is shown as a single entity, the memory 260 may include one or more memory devices having blocks of memory associated with physical addresses, such as random access memory (RAM), read only memory (ROM), flash memory, or other types of volatile and/or non-volatile memory. The memory 260 generally includes program code for performing various functions related to use of the cognitive server 250. The program code is generally described as various functional "applications" or "modules" within the memory 260, although alternate implementations may have different functions and/or combinations of functions.

Within the memory 260, the cognitive insight generator module 262 facilitates generating cognitive insights from data (e.g., data provided by one or more cognitive clients 200). In an embodiment, the cognitive insight generator module 262 includes a cognitive security module 264. The cognitive security module 264 facilitates ensuring the security of cognitive insights, as discussed in subsequent figures (e.g., determining and setting the security level of generated insights, and data used to generate the insights).

In an embodiment, the cognitive server 250 can perform multiple additional tasks. For example, the cognitive server 250 can monitor incoming clients (e.g., incoming VMs) in the system the cognitive server 250 is responsible for (e.g., into a data center, virtual local area network (VLAN), group, cluster, etc.). The cognitive server 250 can process the data accessible to a given user, group, or role, across systems and generate insights. As part of this, the cognitive server 250 can interface and cooperate with a distributed data management server (e.g., an LDAP server).

The cognitive server 250 can determine whether the cumulative insights generated are within the security clearance of the users, or groups, that have access to the data that generated this insight. The cognitive server 250 can then dynamically change or suggest the security levels associated with the new cumulative insights generated by data (e.g., across a set of VMs accessible by a user). The cognitive server 250 can also dynamically change or suggest the security levels associated with the underlying data, based on that data's contribution to the cumulative insights. For example, if access to a newly migrated data repository leads to a user deriving insights with higher security clearance than the user is authorized to access, then the cognitive server 250 can change or suggest to an administrator of the system to increase the security level of the required data that was accessible to this user, to prevent the user from generating such insights. The cognitive server 250 can further share insights with the appropriate users.

Figure 3:
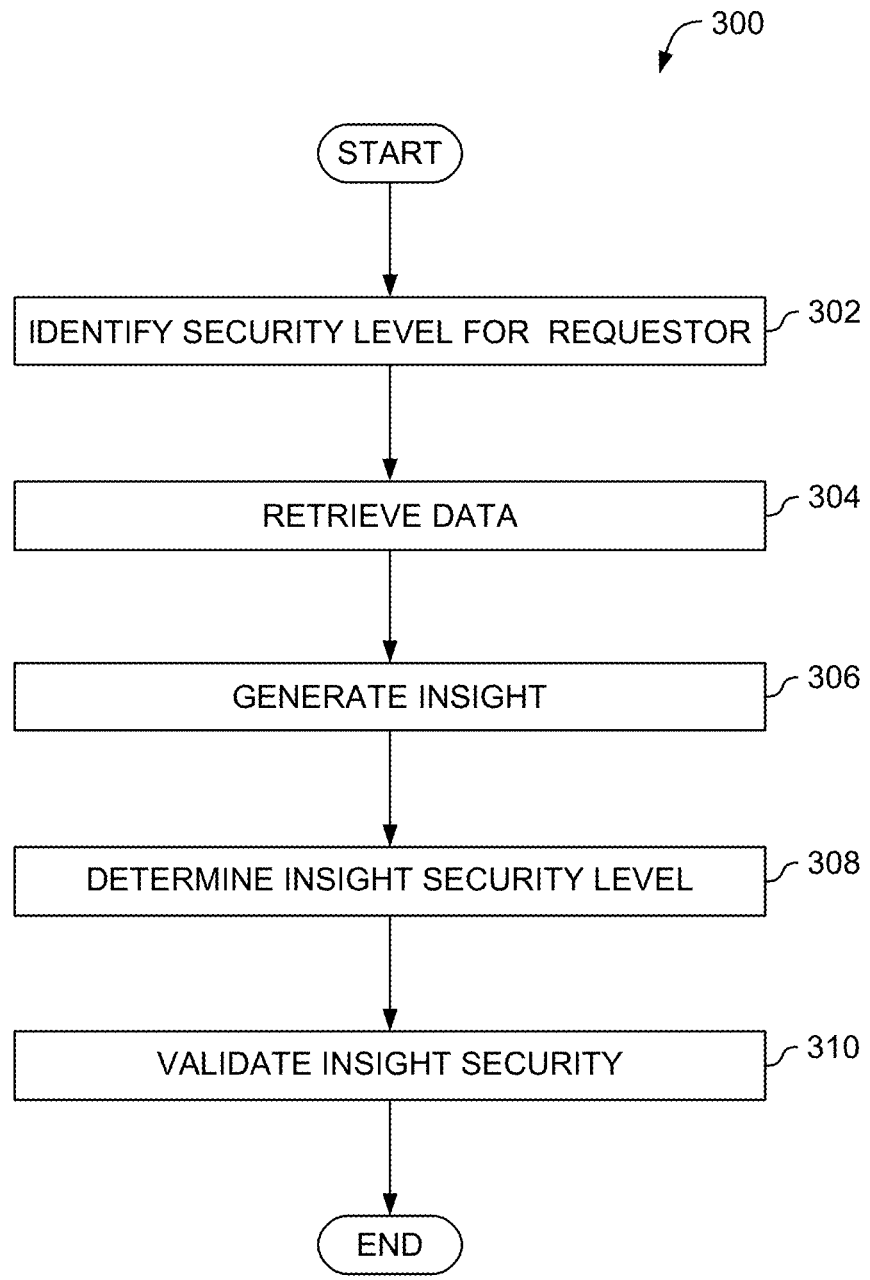
FIG. 3 is a flowchart for ensuring the security of cognitive insights, according to at least one embodiment.

FIG. 3 is a flowchart for ensuring the security of cognitive insights, according to at least one embodiment. At block 302 a cognitive security module (e.g., the cognitive security module 212 in the cognitive client 200 illustrated in FIG. 2, the cognitive security module 264 in the cognitive server 250 illustrated in FIG. 2, or another suitable module) identifies the security level for a requestor of a cognitive insight. In an embodiment, the requestor is a user. In this embodiment, the security level can be tied to the user, tied to a group to which the user belongs, tied to a role associated with the user, or tied to the user in any other suitable way. Alternatively, the requestor can be a group or another suitable entity. As discussed above in relation to FIG. 1, the security level can relate to a governmental security clearance (e.g., confidential, secret, top secret) or any suitable security level (e.g., levels 1-N illustrated in FIG. 1).

At block 304, a cognitive insight generator (e.g., the cognitive insight generator 262 illustrated in FIG. 2) retrieves data to generate the desired insight. For example, as discussed above, the cognitive insight generator has received a request from a user (or another suitable entity) to generate an insight. At block 304, the cognitive insight generator retrieves the data needed to generate the insight. For example, as illustrated in FIG. 1, the cognitive server 120 can retrieve data from the repositories 112A-N.

In an embodiment, the cognitive insight generator is authorized to retrieve data only at a security level which the requestor is authorized to access. For example, as illustrated in FIG. 1, a user might have a security authorization level of 3. In this scenario, the cognitive insight generator (e.g., running on the cognitive server 120) is authorized to retrieve data from all of the cognitive clients 110A-N because the data stored at the repositories 112A-N is all at a security level 3 or below.

In another example, however, the user might have a security authorization level of 2. In this example, the user is not authorized to access the data stored in the repository 112A, because this data is associated with a security level of 3 (higher than the user's level of 2). Thus, the cognitive insight generator will not retrieve data from the repository 112A.

In an embodiment, the cognitive insight generator (or another suitable module) can provide an alert to the requestor that it was not authorized to access potentially relevant data (e.g., stored in repository 112A). The requestor can respond to this alert by seeking to increase the requestor's security authorization (e.g., through a security authority), by modifying the insight request to avoid seeking the higher-security data, or in any other suitable fashion. Alternatively, or in addition, the cognitive insight generator can allow the requestor to automatically increase its authorization, for example by logging in as a higher security user (e.g., using a username and password, biometric identification, a physical or electronic key, etc.). The requestor may be able to increase its security level such that it becomes authorized to access the higher security data.

At block 306, the cognitive insight generator generates the insight. For example, the cognitive insight generator can use the data retrieved at block 304 to generate the insight. In an embodiment, the cognitive insight generator can use a trained machine learning model to generate the insight (e.g., as discussed below in relation to FIG. 6). Alternatively, any other suitable cognitive system can be used.

At block 308, the cognitive insight generator determines the security level of the insight. For example, the cognitive insight generator can use a supervised machine learning model (e.g., as discussed below in relation to FIG. 6) to determine the security level of the insight. In an embodiment, this is a different machine learning model than the model used to generate the insight. The cognitive security machine learning model can be trained using the assigned security levels and data associated with the domain in which the cognitive insight generator is operating (e.g., the subject matter domain). The trained machine learning model can then generate a proposed security level for the insight.

Alternatively, or in addition, the cognitive insight generator can use keyword analysis to determine the security level of the insight. For example, the cognitive insight generator can analyze the data used to generate the insight, and its assigned security level, and can match keywords (and synonyms, etc.) in the generated insight with keywords in the underlying data. The cognitive insight generator can then identify the security level associated with the closest underlying data as the proposed security level for the insight.

In an embodiment, the security level determined by the cognitive insight generator is proposed to an administrator or security authority, who approves the selected security level or assigns a different security level. Alternatively, or in addition, the cognitive insight generator assigns the determined security level to the insight. As another alternative, the cognitive insight generator can temporarily assign the determined security level to the insight, until an administrator or security authority reviews the proposed security level.

At block 310, the cognitive insight generator validates the security level of the insight. In an embodiment, this can include setting the security level of the underlying data based on the security level of the insight (e.g., as determined at block 308). This can also include governing access by the requestor to the insight data. This is discussed in further detail with regard to FIG. 4.

Figure 4:
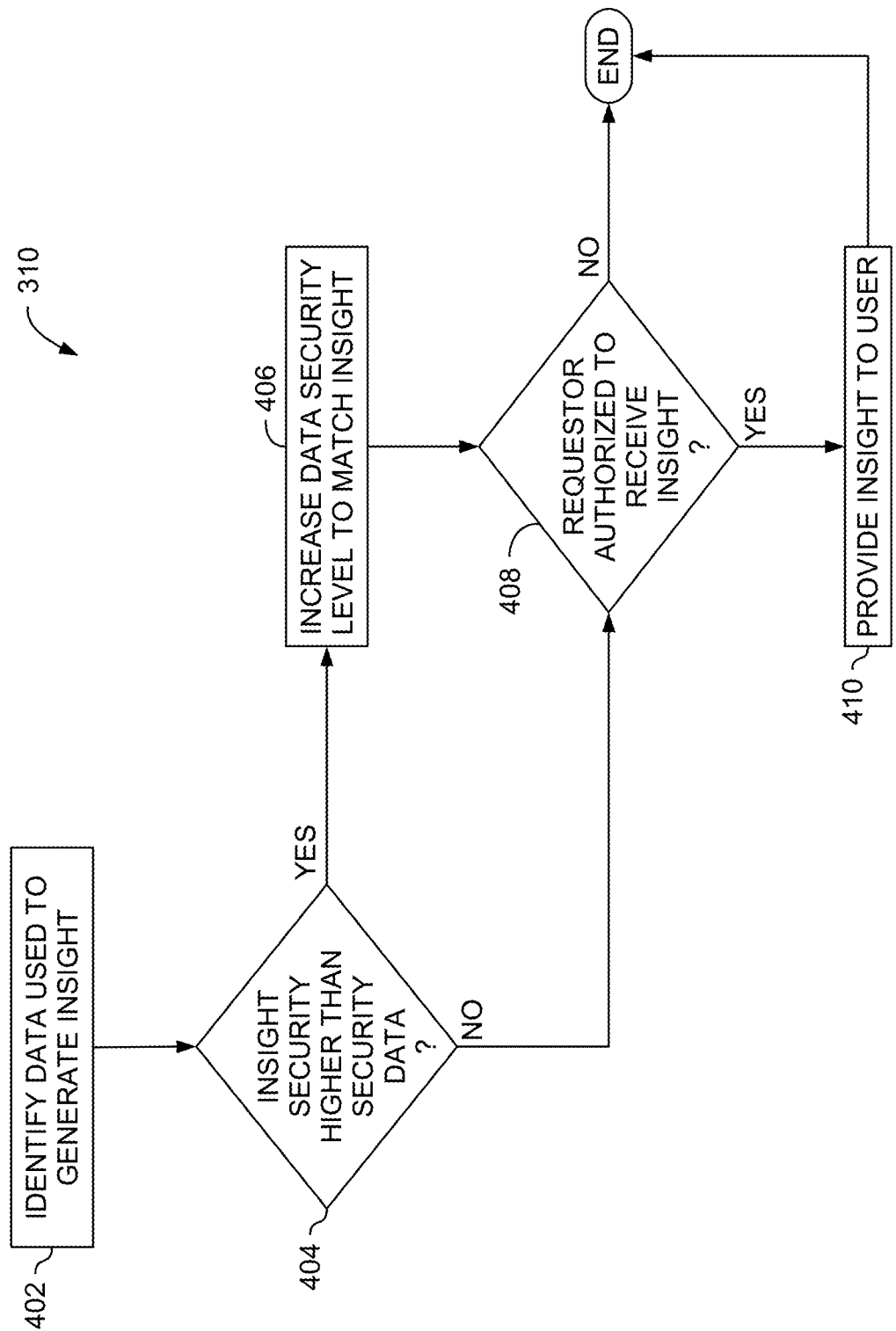
FIG. 4 is a flowchart for validating the security level of a cognitive insight, according to at least one embodiment.

FIG. 4 is a flowchart for validating the security level of a cognitive insight, according to at least one embodiment. In an embodiment, FIG. 4 corresponds with block 310 illustrated in FIG. 3. At block 402, a cognitive security module (e.g., the cognitive security module 212 in the cognitive client 200 illustrated in FIG. 2, the cognitive security module 264 in the cognitive server 250 illustrated in FIG. 2, or another suitable module) identifies the data used to generate the insight. For example, as illustrated in FIG. 1, data from repositories 112A-N is used to generate the insight 130. In this example, at block 402 the cognitive security module (e.g., a cognitive security module in the cognitive server 120 illustrated in FIG. 1) identifies repositories 112A-N.

At block 404, the cognitive security module determines whether the security level for the generated insight is higher than the security level for the data used to generate the insight (e.g., higher than the highest underlying data security level). As discussed above with regard to FIG. 3, at block 308 the cognitive security module determined a security level for the generated insight. At block 404, in an embodiment, the cognitive security module compares the security level for this generated insight (e.g., security level 3 as illustrated in FIG. 1) with the security levels for all data used to generate the insight.

As discussed above, in one embodiment, all data in a given repository has the same assigned security level. Alternatively, the security level can vary across data in a given repository. As another alternative, the security level for a given datum can vary for different requestors (e.g., using security domains). At block 404, the cognitive security module determines whether the insight security level is higher than the underlying security level for data used to generate the insight (e.g., higher than the highest underlying security level). If so, the flow proceeds to block 406.

At block 406, the cognitive security module increases the security level of the underlying data to match the security level of the insight. In an embodiment, the cognitive security module can identify the data that was most recently added or modified, and can increase the security level of this data to match the security level of the insight. This assumes, for example, that appropriate security levels for older data has already been set during prior insight generation (e.g., the cognitive security module has previously analyzed and set the security level of older data when previously generating insights).

This is merely an example, however, and the cognitive security module can increase the security level of any suitable part of the underlying data. For example, the cognitive security module could identify the underlying data with the highest current security level, and could increase that level to match the insight security level. As another example, the cognitive security module could increase the security level for all data used to generate the insight.

As discussed above, in one embodiment the cognitive security module provides a recommended security level for the underlying data to an administrator or security authority. The administrator or security level can choose to assign the recommended security level to the underlying data, and the data can be quarantined until that decision is made. Alternatively, the cognitive security module can set the security for the underlying data. This can be done permanently, temporarily until the administrator or security authority reviews the increased security level, or both (e.g., different data can be handled differently).

At block 408, the cognitive security module determines whether the requestor is authorized to receive the insight. As discussed above with regard to FIG. 1, a given requestor may be authorized to receive data up to a particular security level. If the insight is at or below this level, at block 410 the cognitive security module provides the insight to the user. If the insight exceeds this level, the insight is not provided to the user and the flow ends. In an embodiment, as discussed above, the user can be provided with an alert or notice that the security level of the generated insight exceeds the user's authorization.

Figure 5A:
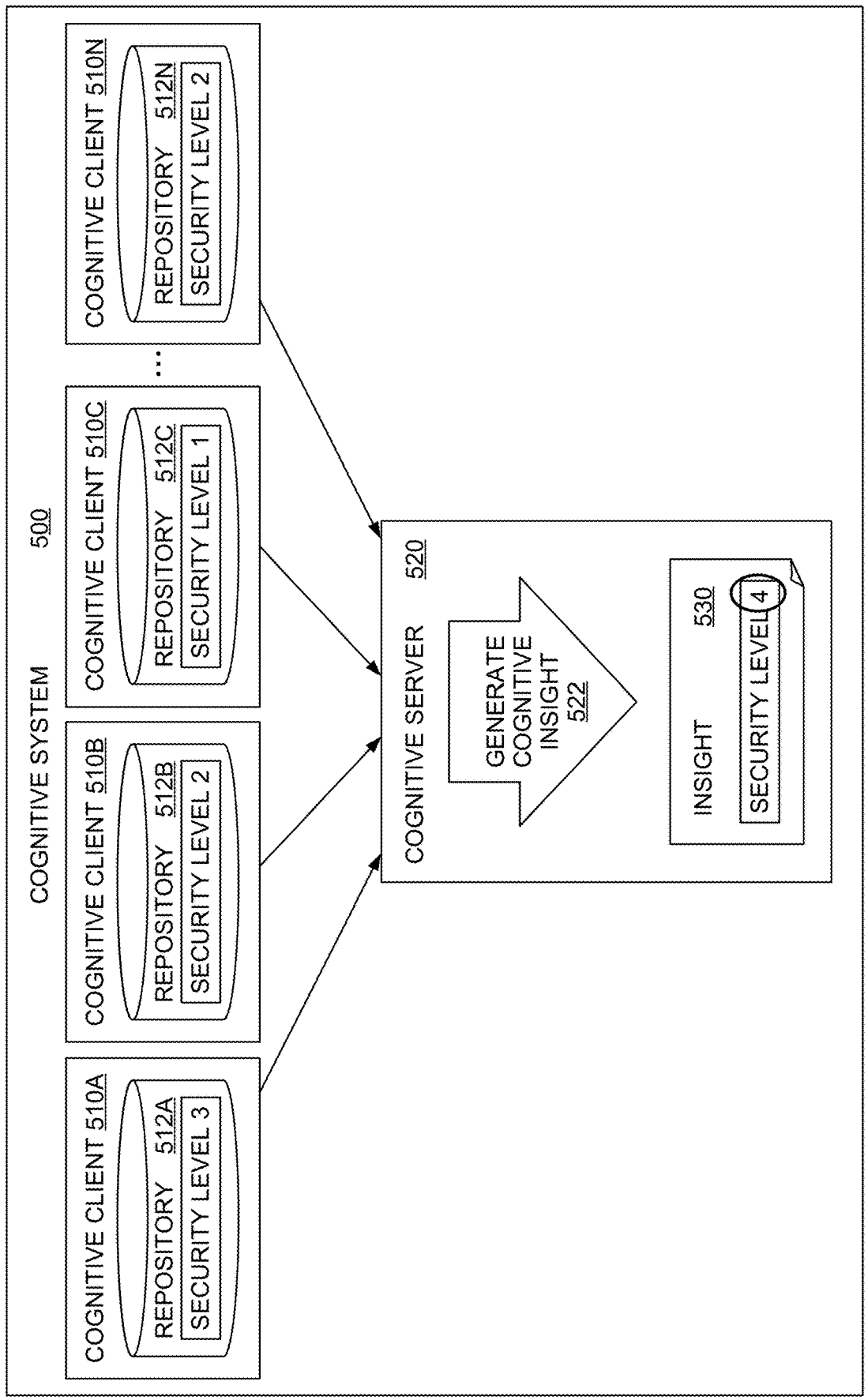
FIG. 5A illustrates ensuring the security of cognitive insights, according to at least one embodiment.
Figure 5B:
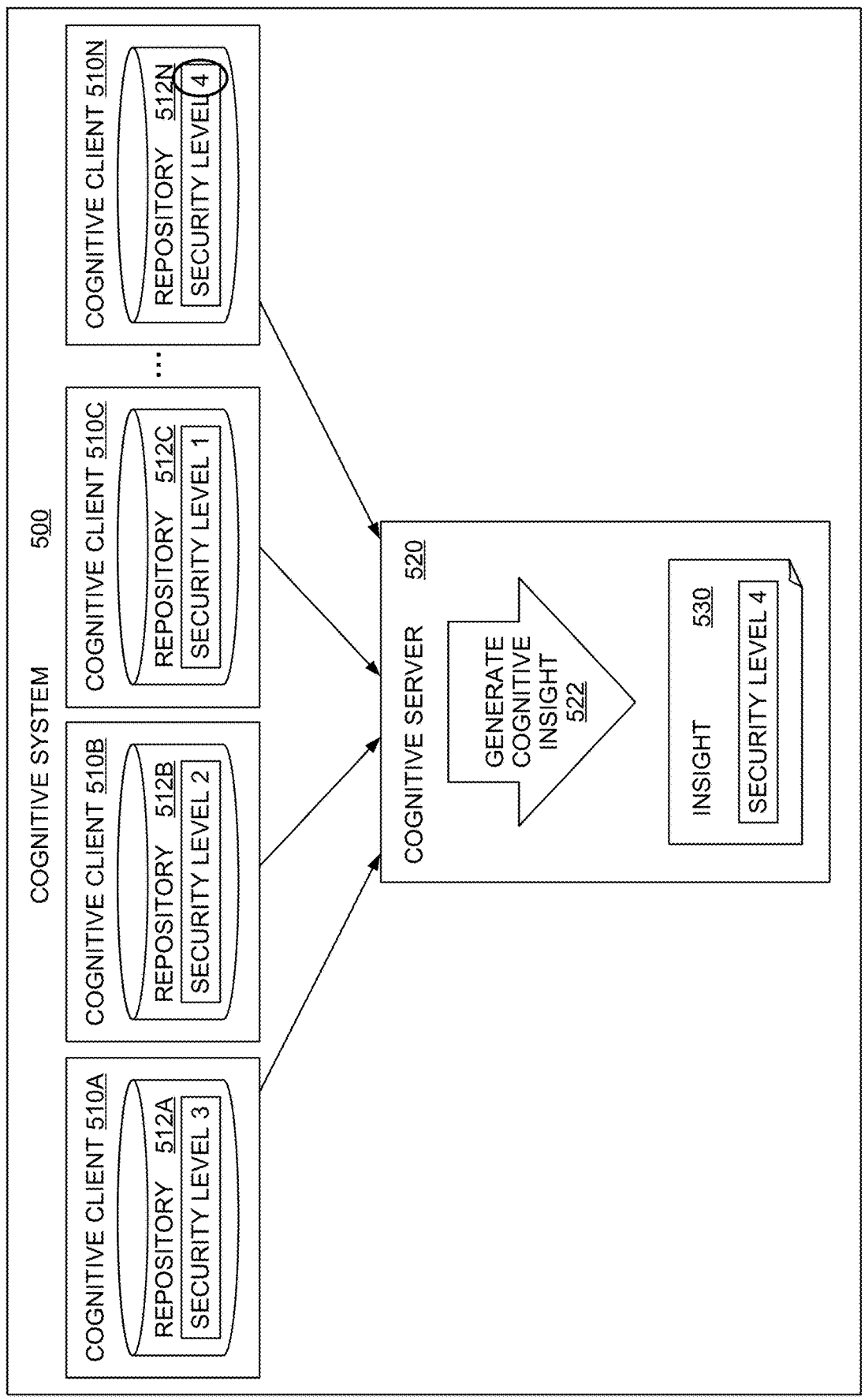
FIG. 5B further illustrates ensuring the security of cognitive insights, according to at least one embodiment.

FIG. 5A-B illustrate ensuring the security of cognitive insights, according to at least one embodiment. In an embodiment, FIGS. 5A-5B correspond with FIG. 1, except the security level of the generated insight 530 exceeds the security level of the underlying data used to generate the insight. A cognitive system 500 includes a number of cognitive clients 510A-510N. Each of the cognitive clients 510A-510N includes a respective data repository 512A-N. Each respective repository is associated with a security level (e.g., 1-4, with 4 being the most secure).

A cognitive server 520 uses the data in the repositories 512A-N to generate a cognitive insight at block 522. The generated insight has a security level of 4. In an embodiment, this security level for the generated insight 530 exceeds the highest security level for the underlying data repositories: the generated insight has a security level of 4, while the highest security level for the underlying data is the security level 3 associated with the repository 512A.

As illustrated in FIG. 5B, and as discussed above with regard to FIGS. 3-4, the cognitive server 520 identifies this discrepancy and the cognitive client 510N changes the security level associated with the repository 512N from 2 to 4, matching the security level of the insight 530. In an embodiment, the repository 512N includes data that is most recently added or modified, of the data used to generate the insight 530, and so the security level associated with the repository 512N is changes. As discussed above this is merely an example, however, and any suitable technique can be used to identify which data should have it security level increased (e.g., based on the content of the data, rules set by the cognitive server 520, rules set by the cognitive client 510N, etc.).

Figure 6:
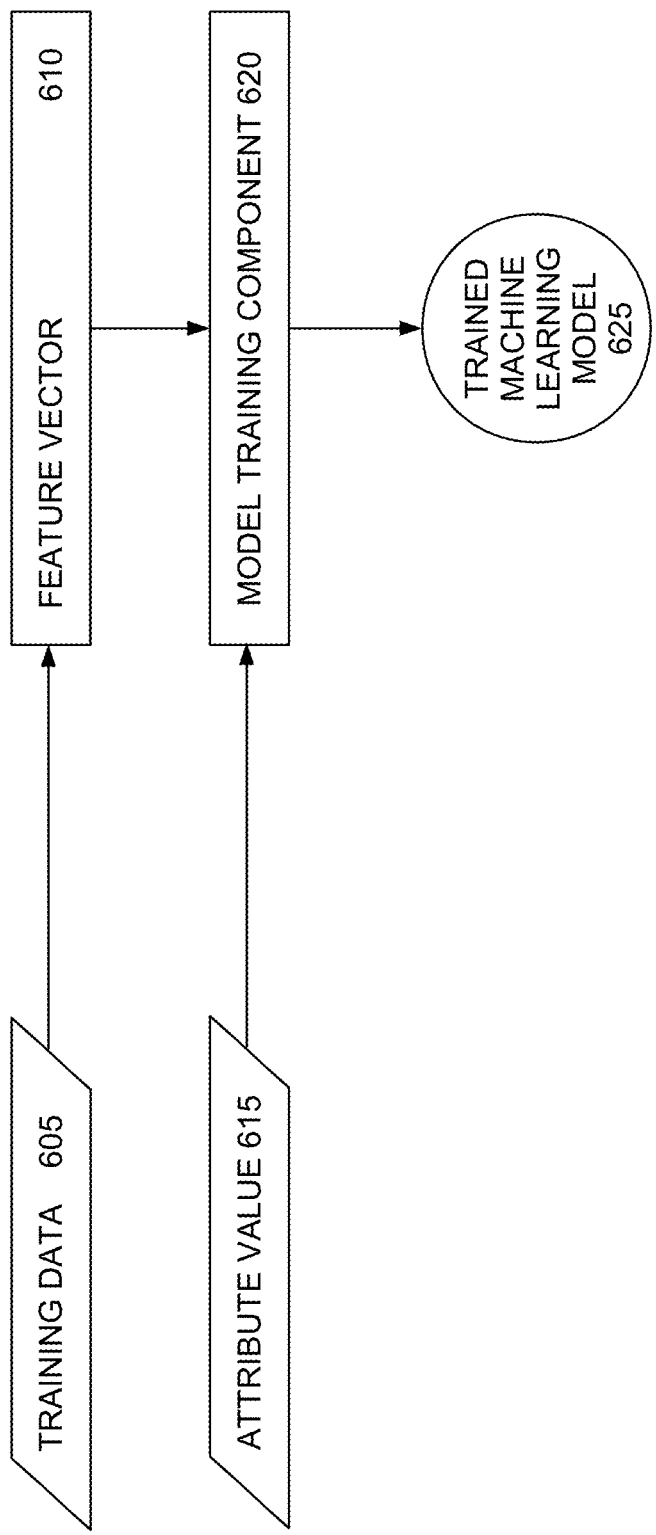
FIG. 6 illustrates generating and updating a supervised machine learning model, according to an embodiment.

FIG. 6 illustrates generating and updating a supervised machine learning model, according to an embodiment. As used herein, "trained machine learning" is used interchangeably with "supervised machine learning," and generally refers to machine learning (ML) that utilizes exemplars and pre-determined attribute scores to train the model. As illustrated, a corpus of training data 605 is converted into feature vectors 610. These feature vectors 610 are provided to a model training component 620, along with a set of associated attribute values 615. That is, the training data 605 is associated with one or more attribute values 615 for the principle attributes used by the system, wherein each of the one or more attribute values 615 represents a measure of an attribute indicated by the corresponding training data 605. The model training component 620 uses supervised machine learning techniques to generate and update a trained machine learning model 625, which can then be used to process new electronic data. Such techniques may include classification and regression techniques (e.g., as discussed above in relation to FIGS. 3 and 4), among others. In this way, an updated model can be maintained.

Figure 7:
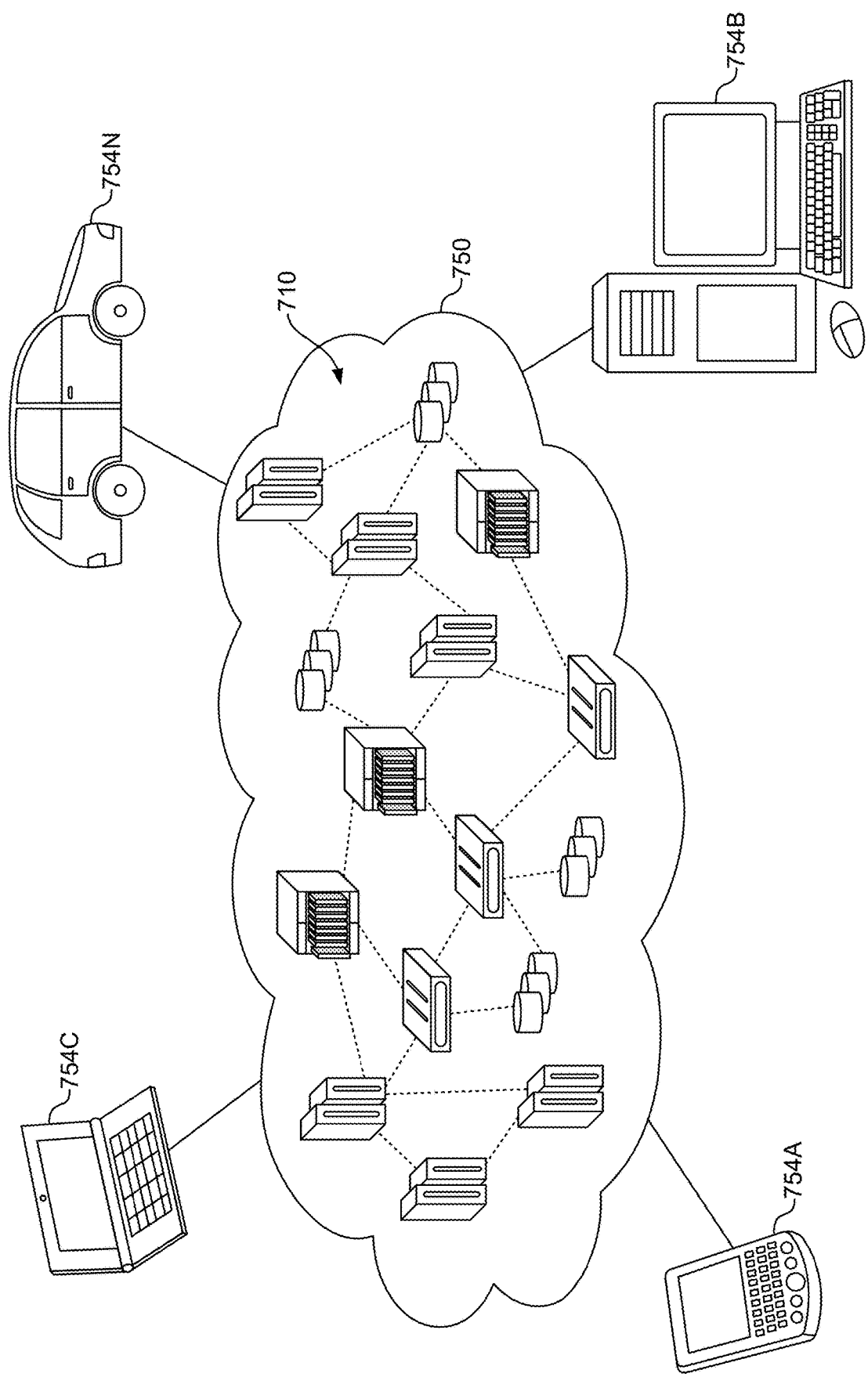
FIG. 7 depicts a cloud computing environment, according to an embodiment.

FIG. 7 depicts a cloud computing environment, according to an embodiment. It is to be understood that although this disclosure includes a detailed description on cloud computing, implementation of the teachings recited herein are not limited to a cloud computing environment. Rather, embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling 7, modularity, and semantic interoperability. At the heart of cloud computing is an infrastructure that includes a network of interconnected nodes.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
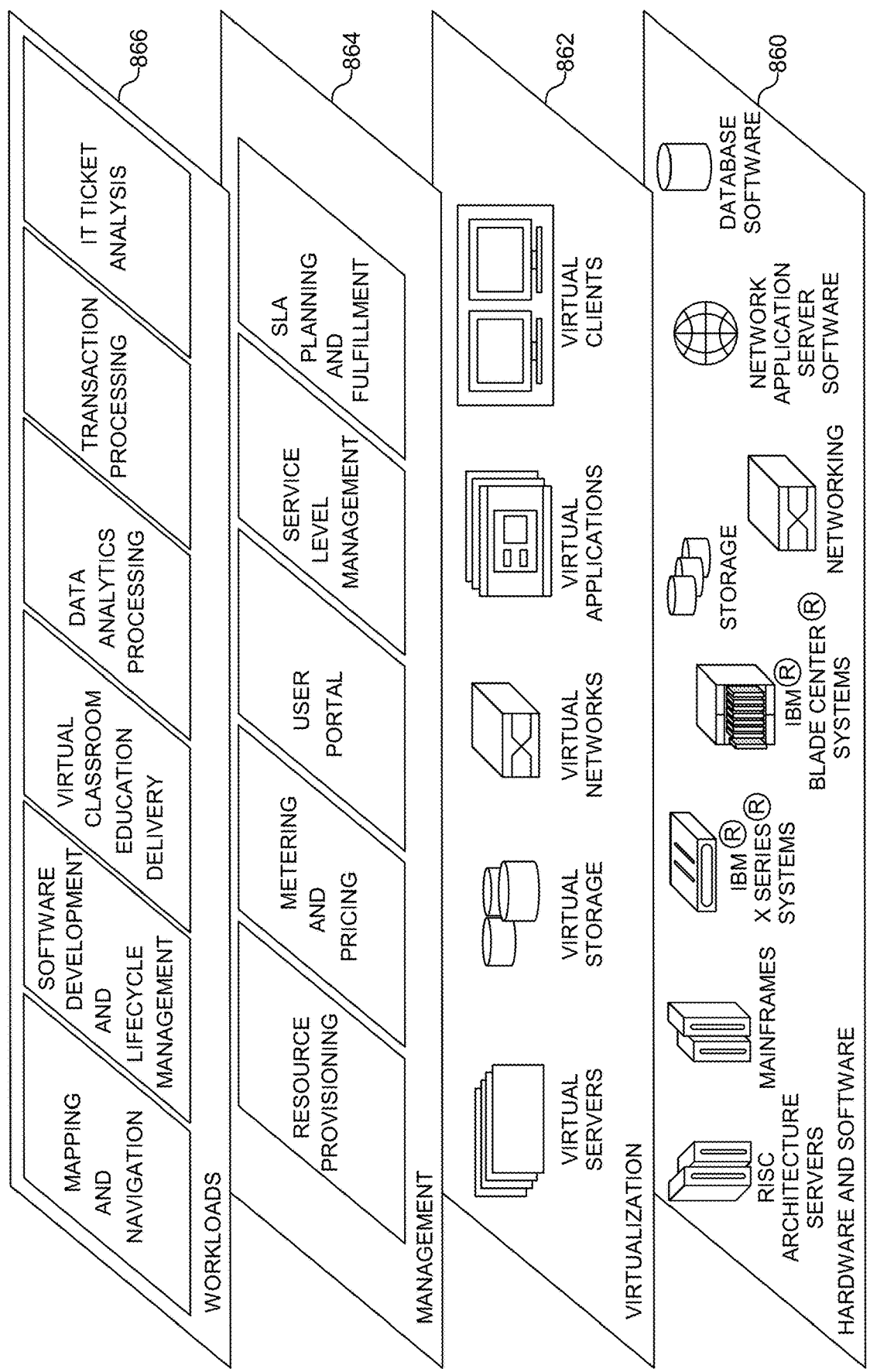
FIG. 8 depicts abstraction model layers, according to an embodiment.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes; RISC (Reduced Instruction Set Computer) architecture based servers; servers; blade servers; storage devices; and networks and networking components. In some embodiments, software components include network application server software and database software.

Virtualization layer 862 provides an abstraction layer from which the following examples of virtual entities may be provided: virtual servers; virtual storage; virtual networks, including virtual private networks; virtual applications and operating systems; and virtual clients.

In one example, management layer 864 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 866 provides examples of functionality for which the cloud computing environment may be utilized. Examples of workloads and functions which may be provided from this layer include: mapping and navigation; software development and lifecycle management; virtual classroom education delivery; data analytics processing; transaction processing; and cognitive analysis. In an embodiment, some or all of the modules of the cognitive server 250 or cognitive client 200 illustrated in FIG. 2 could be implemented in the workloads layer 866. For example, cognitive insight generator module 262 and the cognitive security module 212 could be implemented in the workloads layer 866. For example, the cognitive insight generator 262 could execute on a computing system in the cloud and generate cognitive insights using data stored in the cloud (e.g., the repositories 112A-N illustrated in FIG. 1). In such a case, the cognitive insight generator could retrieve data from the repositories and store a generated insight at a storage location in the cloud. Doing so allows a user to access this information from any computing system attached to a network connected to the cloud (e.g., the Internet)

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
    receiving a request to generate a cognitive insight relating to data from a plurality of data sources, from a requestor, the requestor associated with a requestor data security level;
    generating the cognitive insight using a first machine learning model and a plurality of data sources, each data source associated with a respective data security level;
    identifying, based on the cognitive insight and the plurality of data sources, an insight data security level for the generated cognitive insight relating to access by a plurality of users;
    determining a plurality of data source security levels associated with the plurality of data sources, each data source security level relating to the plurality of users;
    modifying a first data source security level, of the plurality of data source security levels, for the plurality of users, based on determining that the first data source security level differs from the identified insight data security level for the plurality of users; and
    determining, based on the requestor data security level and the insight data security level, that the requestor is authorized to access the generated cognitive insight, and in response providing the generated cognitive insight to the requestor.

2. The method of claim 1, wherein the identifying, based on the cognitive insight and the plurality of data sources, the insight data security level for the generated cognitive insight further comprises:
    determining the insight data security level by analyzing the cognitive insight and the plurality of data sources using a second machine learning model.

3. The method of claim 2, wherein the cognitive insight relates to a subject matter area and wherein the second machine learning model is trained using data relating to the subject matter area.

4. The method of claim 1, wherein the identifying, based on the cognitive insight and the plurality of data sources, the insight data security level for the generated cognitive insight further comprises:
    identifying one or more key words in the insight, the one or more key words corresponding with the insight data security level.

5. The method of claim 4, further comprising:
    determining that the one or more key words correspond with the insight data security level based on identifying the one or more key words in data associated with the insight data security level.

6. The method of claim 1, wherein modifying the first data security level further comprises:
    determining, based on the insight data security level, that the first data security level should be increased, and in response increasing the first data security level to match the insight data security level.

7. The method of claim 6, wherein the determining, based on the insight data security level, that the first data security level should be increased further comprises:
    determining that the insight data security level is higher than the plurality of respective data security levels associated with the plurality of data sources.

8. The method of claim 1, further comprising:
    setting a data security level for the generated cognitive insight to the identified insight data security level.

9. The method of claim 1, further comprising:
    providing the identified insight data security level to a system administrator using a user interface;
    receiving a response from the system administrator accepting the identified insight data security level; and
    setting the data security level for the generated cognitive insight to the identified insight data security level, based on the response.

10. The method of claim 1, further comprising:
    receiving a second request to generate a second cognitive insight from a second requestor, the second requestor associated with a second requestor data security level;
    generating the second cognitive insight using a second machine learning model and a second plurality of data sources, each data source associated with a second respective data security level;
    identifying, based on the second cognitive insight and the second plurality of data sources, a second insight data security level for the generated second cognitive insight; and
    determining, based on the second requestor data security level and the second insight data security level, that the second requestor is not authorized to access the generated second cognitive insight, and in response declining to provide the second cognitive insight to the second requestor.

11. A system, comprising:
    a processor; and
    a memory storing a program, which, when executed on the processor, performs an operation, the operation comprising:
        receiving a request to generate a cognitive insight relating to data from a plurality of data sources, from a requestor, the requestor associated with a requestor data security level;

generating the cognitive insight using a first machine learning model and a plurality of data sources, each data source associated with a respective data security level;

identifying, based on the cognitive insight and the plurality of data sources, an insight data security level for the generated cognitive insight relating to access by a plurality of users;

determining a plurality of data source security levels associated with the plurality of data sources, each data source security level relating to the plurality of users;

modifying a first data source security level, of the plurality of data source security levels, for the plurality of users, based on determining that the first data source security level differs from the identified insight data security level for the plurality of users; and determining, based on the requestor data security level and the insight data security level, that the requestor is authorized to access the generated cognitive insight, and in response providing the generated cognitive insight to the requestor.

12. The system of claim 11, wherein the identifying, based on the cognitive insight and the plurality of data sources, the insight data security level for the generated cognitive insight further comprises:

determining the insight data security level by analyzing the cognitive insight and the plurality of data sources using a second machine learning model.

13. The system of claim 11, wherein the identifying, based on the cognitive insight and the plurality of data sources, the insight data security level for the generated cognitive insight further comprises:

identifying one or more key words in the cognitive insight, the one or more key words corresponding with the insight data security level.

14. The system of claim 11, wherein modifying the first data security level further comprises:

determining, based on the insight data security level, that the first data security level should be increased, and in response increasing the first data security level to match the insight data security level.

15. The system of claim 14, wherein the determining, based on the insight data security level, that the first data security level should be increased further comprises:

determining that the insight data security level is higher than the plurality of respective data security levels associated with the plurality of data sources.

16. A non-transitory computer program product comprising:

a computer-readable storage medium having computer-readable program code embodied therewith, the computer-readable program code executable by one or more computer processors to perform an operation, the operation comprising:

receiving a request to generate a cognitive insight relating to data from a plurality of data sources, from a requestor, the requestor associated with a requestor data security level;

generating the cognitive insight using a first machine learning model and a plurality of data sources, each data source associated with a respective data security level;

identifying, based on the cognitive insight and the plurality of data sources, an insight data security level for the generated cognitive insight relating to access by a plurality of users;

determining a plurality of data source security levels associated with the plurality of data sources, each data source security level relating to the plurality of users;

modifying a first data source security level, of the plurality of data source security levels, for the plurality of users, based on determining that the first data source security level differs from the identified insight data security level for the plurality of users; and determining, based on the requestor data security level and the insight data security level, that the requestor is authorized to access the generated cognitive insight, and in response providing the generated cognitive insight to the requestor.

17. The computer program product of claim 16, wherein the identifying, based on the cognitive insight and the plurality of data sources, the insight data security level for the generated cognitive insight further comprises:

determining the insight data security level by analyzing the cognitive insight and the plurality of data sources using a second machine learning model.

18. The computer program product of claim 16, wherein the identifying, based on the cognitive insight and the plurality of data sources, the insight data security level for the generated cognitive insight further comprises:

identifying one or more key words in the cognitive insight, the one or more key words corresponding with the insight data security level.

19. The computer program product of claim 16, wherein modifying the first data security level further comprises:

determining, based on the insight data security level, that the first data security level should be increased, and in response increasing the first data security level to match the insight data security level.

20. The computer program product of claim 19, wherein the determining, based on the insight data security level, that the first data security level should be increased further comprises:

determining that the insight data security level is higher than the plurality of respective data security levels associated with the plurality of data sources.

* * * * *